United States Patent [19]

Raj

[11] Patent Number: 4,793,650
[45] Date of Patent: Dec. 27, 1988

[54] CUSTOMIZED AUTOMOBILE ROOF AND WINDOW CONSTRUCTION

[75] Inventor: Joseph T. Raj, Riverview, Mich.

[73] Assignee: Evans Automotive, Division of Evans Industries, Inc., Wayne, Mich.

[21] Appl. No.: 101,585

[22] Filed: Sep. 28, 1987

[51] Int. Cl.⁴ .................. B60D 25/06; B60N 1/00; B21K 21/16

[52] U.S. Cl. .................. 296/210; 29/401.1; 296/201

[58] Field of Search ............ 296/201, 210, 211, 145, 296/1 R, 84 R, 84 C, 97 A, 197; 29/401.1; 150/52 K; D12/90, 91, 155, 156, 183; 52/22, DIG. 4

[56] References Cited

U.S. PATENT DOCUMENTS

| | | | |
|---|---|---|---|
| 2,010,350 | 8/1935 | Davis | 296/1 R X |
| 3,926,471 | 12/1975 | Nadasi et al. | 296/210 |
| 4,154,473 | 5/1979 | Alexander et al. | 296/210 |
| 4,555,434 | 11/1985 | Kunert | 296/84 R X |

FOREIGN PATENT DOCUMENTS 2500795  9/1982  France ................. 296/97 A
0099720  6/1985  Japan .................. 296/84 R Primary Examiner—Andres Kashnikow
Assistant Examiner—Robert J. Oberleitner
Attorney, Agent, or Firm—Barnes, Kisselle, Raisch, Choate, Whittemore & Hulbert

[57] ABSTRACT

A customized roof construction and method of making for changing the appearance of an automobile which has a side window opening wherein a portion of the body of the automobile covers a desired window position in the customized roof which comprises masking a portion of the window while leaving another portion of the window and the portion of the body associated with the window unmasked, applying a deeply tinted transparent panel over the unmasked portion of the window and the portion of the body where it is desired to provide the effect of the desired window, thereafter, applying a roof cap with a window opening corresponding substantially to the area of the tinted panel such as to provide a window having the substantially different configuration from the original window of the automobile with a portion of the window overlying a portion of the body of the automobile.

4 Claims, 1 Drawing Sheet

CUSTOMIZED AUTOMOBILE ROOF AND WINDOW CONSTRUCTION

This invention relates to customizing of automobiles.

BACKGROUND AND SUMMARY OF THE INVENTION

A popular and desired feature of automobiles is the customizing of a roof and providing different window treatments on the automobile. Where the automobile has a side window or quarter window that has an unusual configuration, it is difficult to provide a customized top with a different window opening.

Accordingly, among the objectives of the present invention are to provide a customizing roof construction and method of making wherein the appearance of the customized roof and window differs very substantially from the configuration of the original window over which the roof is provided in at least one dimension; which can be achieved with a minimum of parts; and which will produce a substantially different overall appearance.

In accordance with the invention, there is provided a customized roof construction and method of making for changing the appearance of an automobile which has a side window opening wherein a portion of the body of the automobile covers a desired window position in the customized roof comprising masking a portion of the window while leaving another portion of the window and the portion of the body associated with the window unmasked, applying a deeply tinted transparent panel over the unmasked portion of the window and the portion of the body where it is desired to provide the effect of the desired window, the tinted panel having low light transmission characteristics, applying a roof cap with a window opening corresponding substantially to the area of the tinted panel such as to provide a window having a substantially different configuration from the original window of the automobile with a portion of the window overlying a portion of the body of the automobile.

DESCRIPTION

Figure 1:
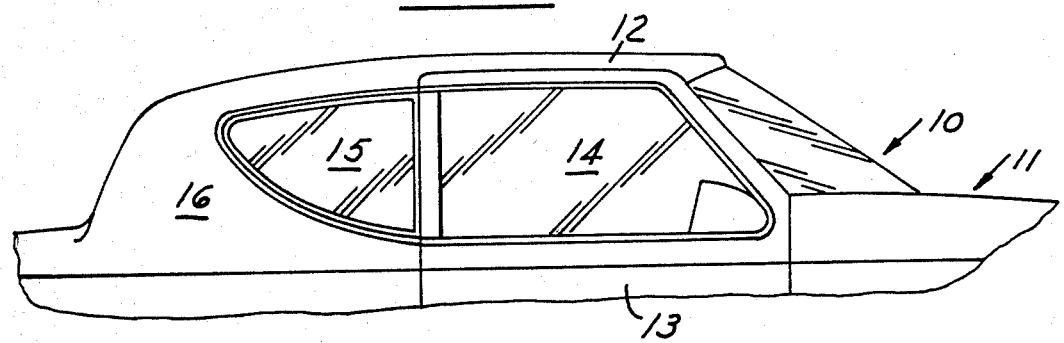
FIG. 1 is a fragmentary side elevation view of an automobile to which the invention is applied

Referring to FIG. 1, the invention is shown as applied to an automobile 10 having a body 11 with a roof panel 12, a door 13 having a window 14, and a rear or quarter window 15 formed by body portion 16 wherein, in the case indicated, the longest horizontal dimension of the window 15 is greater than the height of the window and the lower edge of the window is defined by a curved line extending upwardly and rearwardly.

The invention is intended to provide a roof cap 17 which has a window opening 18 of substantially different configuration and overlying a portion 19 of the body.

Figure 2:
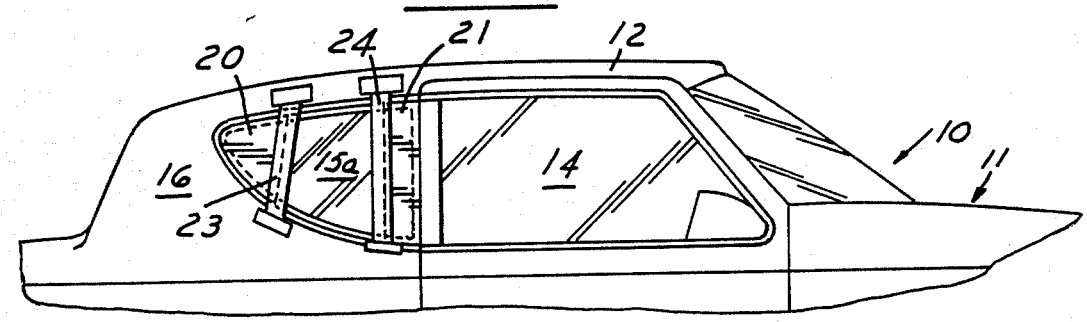
FIGS. 2, 3 and 4 are views showing successive stages in the method of customizing the automobile.

In accordance with the invention, opaque parts 20, 21 are positioned by tape 23, 24 to cover the portions of the window 15 that are to be obscured, leaving a central portion which is to form a part of the final window (FIG. 2).

Figure 3:
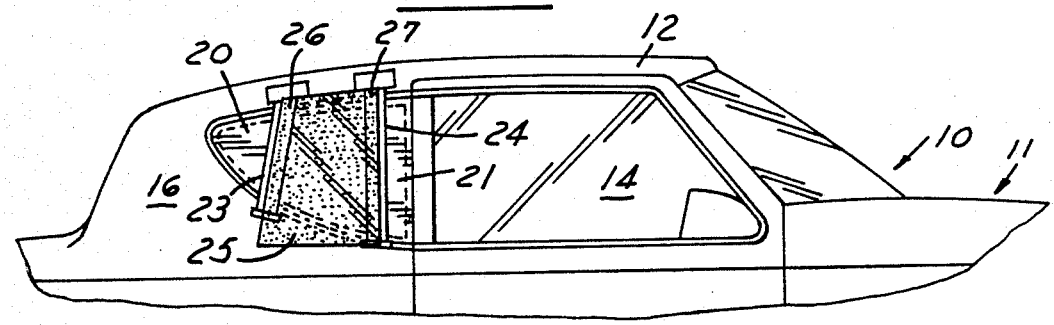
Figure 4:
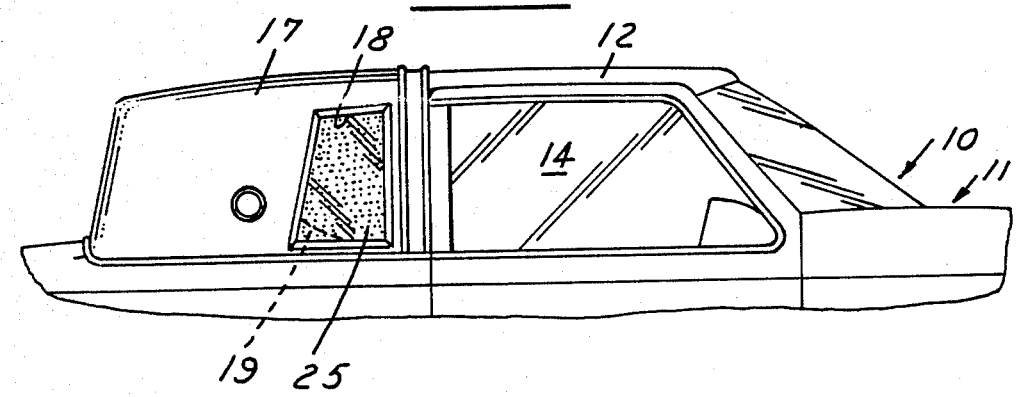

A pre-cut piece of transparent tinted panel 25 is provided in overlying relationship to the remaining portion 15a of the window and held in position by tapes 26, 27 (FIG. 3). The panel 25 extends into overlying relationship with the body portion 19 to produce the substantially different configuration of the window, herein shown as having a greater height than width. When the cap 17 is applied over the roof 12 and panels 25 on each side of the automobile and fastened in accordance with well known construction, the resultant effect is that of a completely different appearance to the vehicle, even though the resultant window 15a overlies a portion of the portion 19 of the body (FIG. 4).

The panel 25 is made of a material having low light transmission characteristics within the minimum standards permitted in an automobile window so that although there is a shadow provided by the body portion 19 upon close inspection, the overall effect is one of an automobile having a window which differs very substantially from the window 15 in FIG. 1.

Although the invention has been described in connection with an automobile having a side window with specific window configuration, it is also applicable to automobiles with other side window configurations wherein it is desired to present a different window configuration.

I claim:

1. A method of making a customized roof construction for changing the appearance of an automobile which has an original window opening wherein a portion of the body of the automobile covers a desired window in the customized roof comprising masking a portion of the window while leaving a portion of the window and a portion of the body associated with the original window unmasked, applying a deeply tinted transparent panel over the unmasked portion of the window and said portion of the body where it is desired to provide the effect of a window, the tinted panel having low light transmission characteristics, and thereafter applying a roof cap with a window opening corresponding substantially to the unmasked portion of the tinted panel and said portion of such as to provide a window having a substantially different configuration from the original window of the automobile with a portion of the window overlying said portion of the body of the automobile.

2. The method set forth in claim 1 wherein said side window of said automobile comprises a window that has a generally triangular configuration having a horizontal dimension greater that its height and its lower edge defined by a curved line extending upwardly and rearwardly, said tinted transparent panel being generally rectangular and having a height greater than a width and wherein said tinted transparent panel is applied such that it overlies the curved lower edge and said portion of the body below the lower edge to provide the effect of a window having a substantially different configuration.

3. A customized roof construction for changing the appearance of an automobile which has an original window opening wherein a portion of the body of the automobile covers a desired window position in the customized roof comprising portions of the window being masked while leaving a portion of the window and a portion of the body associated with the original window unmasked, a deeply tinted transparent panel applied over the unmasked portion of the window and said portion of the body where it is desired to provide the effect of a window, said tinted panel having low light transmission characteristics, and a roof cap with a window opening corresponding substantially to the unmasked portion of the tinted panel and said portion of such as to provide a window having a substantially different configuration from the original window of the automobile with a portion of the window overlying said portion of the body of the automobile.

4. The customized roof construction set forth in claim 3 wherein said side window of said automobile comprises a window that has a generally triangular configuration having a horizontal dimension greater than its height and its lower edge defined by a curved line extending upwardly and rearwardly, said tinted transparent panel being generally rectangular and having a height greater than a width and wherein said tinted transparent panel is applied such that it overlies the curved lower edge and said portion of the body below the lower edge to provide the effect of a window having a substantially different configuration.

* * * * *